US012796707B2

(12) United States Patent
Motoike et al.

(10) Patent No.: US 12,796,707 B2
(45) Date of Patent: Nov. 17, 2026

(54) OIL-BASED FOOD PRODUCT

(71) Applicant: FUJI OIL HOLDINGS INC., Osaka (JP)

(72) Inventors: Hideki Motoike, Tsukubamirai (JP); Chiaki Miyazaki, Tsukubamirai (JP)

(73) Assignee: FUJI OIL CO., LTD., Osaka (JP)

(*) Notice: Subject to any disclaimer, the term of this patent is extended or adjusted under 35 U.S.C. 154(b) by 305 days.

(21) Appl. No.: 18/279,240

(22) PCT Filed: Mar. 15, 2022

(86) PCT No.: PCT/JP2022/011514
§ 371 (c)(1),
(2) Date: Aug. 29, 2023

(87) PCT Pub. No.: WO2022/209842
PCT Pub. Date: Oct. 6, 2022

(65) Prior Publication Data

US 2024/0148015 A1 May 9, 2024

(30) Foreign Application Priority Data

Mar. 30, 2021 (JP) ................................ 2021-057691

(51) Int. Cl.
*A23G 1/48* (2006.01)
*A23G 1/40* (2006.01)

(52) U.S. Cl.
CPC .................................... *A23G 1/48* (2013.01); *A23G 1/40* (2013.01)

(58) Field of Classification Search
CPC ................................ A21D 2/362; A21D 6/003
See application file for complete search history.

(56) References Cited

U.S. PATENT DOCUMENTS

| | | | | | |
|---|---|---|---|---|---|
| 4,119,740 | A | * | 10/1978 | Crespo | A23G 9/322 426/631 |
| 4,335,153 | A | | 6/1982 | Rikon et al. | |
| 5,026,568 | A | | 6/1991 | Takemori et al. | |
| 5,202,147 | A | * | 4/1993 | Traska | A23L 25/10 426/524 |
| 10,555,543 | B2 | * | 2/2020 | Choromanski | A23G 1/44 |
| 2010/0143568 | A1 | | 6/2010 | Quail et al. | |

FOREIGN PATENT DOCUMENTS

| | | | | |
|---|---|---|---|---|
| AT | 163512 | | 7/1947 | |
| CN | 107410625 | | 12/2017 | |
| JP | 57-36938 | | 2/1982 | |
| JP | 64-34247 | | 2/1989 | |
| JP | 2-84135 | | 3/1990 | |
| JP | 10-33126 | | 2/1998 | |
| JP | 2006-20523 | | 1/2006 | |
| JP | 2009-543562 | | 12/2009 | |
| JP | 2015-27280 | | 2/2015 | |
| JP | 2015027280 | * | 12/2015 | |
| WO | 2007/023800 | | 3/2007 | |
| WO | WO-2012089257 A1 | * | 7/2012 | A23B 7/14 |
| WO | 2021/200875 | | 10/2021 | |

OTHER PUBLICATIONS

Extended European Search Report issued Jan. 21, 2025 in European Patent Application No. 22780063.8, pp. 1-12.
A C Noorden, “Cocoa Powder Alternatives, Some Experiences From Practice”, CMM Confectionery Manufacture and Marketing, J.G. Kennedy & Co., Ltd., Oct. 1, 1981, vol. 18, No. 10, pp. 32-33.
Rin Rin Yuko Kishida, “Caramelized milk almonds with matcha and soybean flour”, Cookpad, Nov. 28, 2008, https://cookpad.com/recipe/318372, [Search Date Jan. 6, 2023], with machine translation, pp. 1-5.
Yumikoro, “Caramel apple chocolate pound”, Cookpad, Feb. 12, 2008, https://cookpad.com/recipe/496849, [Search Date Jan. 6, 2023], with machine translation, pp. 1-5.
Ma fleur, “Lotus-style ♪ Fragrant caramel biscuit”, Cookpad, Jun. 11, 2010, https://cookpad.com/recipe/907582, [Search Date Jan. 6, 2023], with machine translation, pp. 1-5.
Notification of Reasons for Refusal dated Jan. 18, 2023 issued in the corresponding Japanese Patent Application No. 2022-563932, with machine translation, pp. 1-18.
Notification of Reasons for Refusal dated Jul. 25, 2023 issued in the corresponding Japanese Patent Application No. 2022-563932, with machine translation, pp. 1-5.
International Search Report issued May 24, 2022 in corresponding International Patent Application No. PCT/JP2022/011514, with English translation, pp. 1-7.
International Preliminary Report on Patentability issued Oct. 3, 2023 in the corresponding International Patent Application No. PCT/JP2022/011514, with English translation, pp. 1-13.

* cited by examiner

*Primary Examiner* — Kelly J Bekker
(74) *Attorney, Agent, or Firm* — Wenderoth, Lind & Ponack, L.L.P.

(57) ABSTRACT

To provide a novel oil-based food product. The oil-based food product contains a legume-derived roasted powder material, a roasted saccharide, and an unroasted saccharide.

7 Claims, No Drawings

OIL-BASED FOOD PRODUCT

TECHNICAL FIELD

The present invention relates to an oil-based food product obtained using a legume-derived powder material and a method for producing the oil-based food product.

BACKGROUND ART

Chocolate, which is a kind of oil-based food product, is composed of components derived from cacao, such as cocoa mass, cacao butter, or cocoa powder; sugar; and the like. Chocolate is favored for its unique flavor and texture and is consumed all over the world. However, areas where cacao can be harvested are limited, and chocolate produced using cacao as a main raw material is expensive.

Among components derived from cacao, cacao butter has been studied to produce an alternative material by fractionation and transesterification of palm oil or the like. Such an alternative material has become available at a lower cost than that of cacao butter.

Patent Literature 1 discloses as a cocoa powder substitute a chocolate-like food product containing a soybean protein extraction residue as a main component.

Patent Literature 2 discloses a snack food produced by grinding and processing deodorized soybeans.

CITATION LIST

Patent Literature

Patent Literature 1: JP 2015-027280 A
Patent Literature 2: JP H02-084135 A

SUMMARY OF INVENTION

Technical Problem

The present inventors have studied a novel oil-based food product which has a reduced amount of components derived from cacao.

The method described in Patent Literature 1 has a problem in terms of flavor and has not been able to entirely replace the cocoa powder.

Thus, an object of the present invention is to provide a novel oil-based food product having a reduced amount of components derived from cacao and also having excellent flavor.

Solution to Problem

As a result of diligent studies to solve the above problems, the present inventors have completed the present invention in which an oil-based food product includes a legume-derived roasted powder material, a roasted saccharide, and an unroasted saccharide.

That is, the present invention is:

(1) an oil-based food product containing a legume-derived roasted powder material, a roasted saccharide, and an unroasted saccharide;

(2) the oil-based food product according to (1), wherein a mixture of the legume-derived roasted powder material and the roasted saccharide has an L value in the color space of 40 to 60;

(3) the oil-based food product according to (1), wherein the roasted saccharide is a product obtained by roasting an aqueous saccharide solution;

(4) the oil-based food product according to (2), wherein the roasted saccharide is a product obtained by roasting an aqueous saccharide solution;

(5) the oil-based food product according to any of (1) to (4), wherein the aqueous saccharide solution is an aqueous monosaccharide solution;

(6) the oil-based food product according to any of (1) to (5), wherein the legume-derived roasted powder material and the roasted saccharide are a product obtained by roasting at the same time;

(7) the oil-based food product according to any one of (1) to (5), wherein a total amount of cocoa mass and cocoa solids is less than 5 wt. %; and (8) a method for producing an oil-based food product, the method including roasting a mixture of a legume-derived powder material and a saccharide, and including the roasted mixture and an unroasted saccharide in the oil-based food product.

Advantageous Effects of Invention

According to the present invention, the oil-based food product can be provided with reduced components derived from cacao.

As a preferred aspect, the oil-based food product can be provided without using components derived from cacao. The resulting oil-based food product has a preferred flavor without an unpleasant flavor of the legume-derived powder material.

DESCRIPTION OF EMBODIMENTS

An oil-based food product according to an embodiment of the present invention contains a legume-derived roasted powder material, a roasted saccharide, and an unroasted saccharide. In the present specification, the legume-derived roasted powder material is a powder material produced by roasting a legume-derived powder material.

The legume-derived powder material that can be used in an embodiment of the present invention refers to powders in general derived from the whole and/or part of a bean or pea, which is in the seed state of a legume.

Examples of the legume include soybean, mung bean, green bean, pea, murasaki-hanamame (purple flower bean, scarlet runner bean, *Phaseolus coccineus*), adzuki bean, and chickpea.

The legume-derived powder material is preferably soybean, mung bean, green bean, pea, murasaki-hanamame, or adzuki bean; more preferably soybean, mung bean, green bean, pea, or murasaki-hanamame; even more preferably mung bean, green bean, pea, or murasaki-hanamame, and more preferably green bean or murasaki-hanamame. These are preferred in that a flavor suitable for the oil-based food product is obtained.

For the oil-based food product according to an embodiment of the present invention, the legume-derived roasted powder material produced by roasting the legume-derived powder material described above is used. The conditions for roasting the legume-derived powder material can be appropriately adjusted by checking the quality of the oil-based food product produced using the resulting legume-derived roasted powder material and thus are not limited, but the roasting conditions can be preferably set according to the color tone of the legume-derived roasted powder material.

The roasted saccharide that can be used in an embodiment of the present invention is preferably a product produced by roasting an aqueous saccharide solution, and an aqueous monosaccharide solution is more preferably used. The monosaccharide is exemplified by glucose, fructose, galactose, and xylose. The monosaccharide is preferably glucose, fructose, or xylose, and more preferably fructose. These are preferred in that a color tone and a flavor suitable for the oil-based food product is obtained. Such saccharides may be used in combination. Honey, brown sugar, and the like containing the component described above can also be used without limitation.

The roasting temperature and time can be adjusted by observing the color tone of the legume-derived roasted powder material and the roasted saccharide and thus are not limited. However, the roasting conditions are exemplified by a temperature preferably of 100° C. to 250° C., more preferably of 120° C. to 250° C., and even more preferably of 140° C. to 200° C.

The roasting time is preferably 10 minutes or more and more preferably 20 minutes or more from the viewpoint of a fragrant flavor and a deep color tone. The temperature and time vary depending on an equipment used for roasting and thus are not limited to the temperatures and time described above, and can be appropriately adjusted and employed according to the color tone and flavor of the legume-derived roasted powder material and the roasted saccharide.

The equipment used for roasting is preferably equipped with a stirring blade because it enables uniform mixing and heating. The heat source may be either gas heating or induction heating (IH) as long as temperature control can be performed. The heat source is preferably IH heating from the viewpoint of easy temperature control.

The color tones of the legume-derived roasted powder material and the roasted saccharide can be visually determined, but as a preferred aspect, for the degree of roasting, the heating conditions can be adjusted using an L value in the color space as an indicator. The L value in the color space is not particularly limited either but is measured using a color difference meter. The color difference meter is exemplified by a colorimetric color difference meter (ZE-6000 available from Nippon Denshoku Industries Co., Ltd.).

As a preferred aspect of the oil-based food product according to an embodiment of the present invention, a mixture of the legume-derived roasted powder material and the roasted saccharide preferably has a L value in the color space of 40 to 60.

Adjusting the L value in the color space to a predetermined range enables preparation of novel oil-based food products adjusted to various color tones while having a good flavor.

As described above, the oil-based food product according to an embodiment of the present invention is obtained using the legume-derived roasted powder material and the roasted saccharide but may be a product obtained by roasting the legume-derived powder material and the saccharide at the same time. This is preferred in that process control can be performed at the same time and the process can be simplified.

In addition, as a preferred aspect, in a step of roasting the legume-derived powder material and a saccharide at the same time, an oil and/or fat component is preferably allowed to be contained in the oil-based food product, from the viewpoint of the flavor improvement. Examples of the oil and/or fat component that can be used include various edible oils and fats. A more preferred oil and/or fat component that can be used is a phospholipid.

Examples of the unroasted saccharide that can be used in an embodiment of the present invention include monosaccharides and disaccharides. Specific examples include sugar (sucrose), lactose, maltose, glucose, a sugar alcohol, and fructose-glucose liquid sugar. Another saccharide, such as trehalose or oligosaccharide; a sugar alcohol; and/or the like may be blended as necessary. At least one selected from the group of those can be used, and the saccharide is preferably in the form of powder from the viewpoint of handling.

A content of the legume-derived roasted powder material in the oil-based food product is preferably from 10 wt. % to 50 wt. %, more preferably from 15 wt. % to 45 wt. %, and even more preferably from 20 wt. % to 40 wt. %.

For the content of the roasted saccharide in the oil-based food product, a content weight ratio of the roasted saccharide to the legume-derived roasted powder material is preferably from 0.01 to 0.5 and more preferably from 0.05 to 0.3.

A content of the unroasted saccharide in the oil-based food product is preferably from 0.5 wt. % to 50 wt. %, more preferably from 0.5 wt. % to 40 wt. %, even more preferably from 10 wt. % to 40 wt. %, and still more preferably from 20 wt. % to 40 wt. %.

A raw material used in the oil-based food product can be used without particular limitation except that the oil-based food product contains the legume-derived roasted powder material, the roasted saccharide, and the unroasted saccharide. The composition of chocolate, a representative oil-based food product, can also be applied as a reference. In one instance, a milk component, an oil and/or fat, and/or any other edible material can be appropriately combined. Examples of any other additive include an emulsifier, an antioxidant, and a flavoring, but the type and amount are not limited, and addition of these may be omitted.

Using the legume-derived roasted powder material according to an embodiment of the present invention and the roasted saccharide enables preparation of chocolate and similar products with good flavor even when a total amount of cacao-derived raw materials, cocoa mass and cocoa solids is less than 5%. Furthermore, this enables preparation of chocolate and similar products containing substantially no cocoa mass or cocoa solids and having good flavor.

The oil and/or fat that can be used is exemplified by vegetable oils and fats, such as rapeseed oil, soybean oil, sunflower seed oil, cottonseed oil, peanut oil, rice bran oil, corn oil, safflower oil, olive oil, kapok oil, sesame oil, evening primrose oil, palm oil, palm kernel oil, coconut oil, medium-chain fatty acid-bound oils and fats (MCT), shea butter, shea fat, and sal fat; animal oils and fats, such as milk fat, beef tallow, lard, fish oil, and whale oil; algal oils; and hydrogenated oils, fractionated oils, hydrogenated fractionated oils, fractionated hydrogenated oils, processed oils and fats obtained by transesterification and/or the like of those; and furthermore mixed oils and fats of these.

In the oil-based food product according to an embodiment of the present invention, a cacao butter equivalent is desirably used to give a preferred hardness. The cacao butter equivalent is also called hard butter, and its type may be either a tempering type or a non-tempering type. According to various qualities required for the oil-based food product, any other oil and/or fat can be appropriately selected and used in combination.

The oil-based food product according to an embodiment of the present invention can be produced by a production process of chocolate and similar products (such as a mixing step, rolling, conching treatment, and a molding cooling and solidifying step).

For the oil-based food product according to an embodiment of the present invention, novel oil-based food products with various color tones and various flavors, such as a dark color tone to a light color tone, a fragrant flavor, and a light flavor to an bitter flavor, can be produced by adjusting the types and blending amounts of the legume-derived powder material, the saccharide to be roasted, and the unroasted saccharide, and adjusting the roasting conditions.

EXAMPLES

Examples of the present invention will be shown below, and the present invention will be more described in more detail. In the examples, values in % and parts are all on a weight basis.

Method for Preparing Oil-Based Food Product

A legume was ground in a commercially available coffee mill and used.

Raw materials listed in the column "roasting" in Table 1 are added and mixed and spread flat.

Roasting was performed using an oven (DKM600 available from Yamato Scientific Co., Ltd.). The heating conditions were adjusted in the ranges of 130 to 190° C. and of 20 to 60 minutes, and a desired degree of roasting was obtained accordingly.

After roasting, all powders and a portion of a melted oil and/or fat are blended according to the blending ratio of the raw materials listed in the column "mixing" in Table 1. A hard butter (trade name "Parkena S" available from Fuji Oil Co., Ltd.) was used as the oil and/or fat.

The dough was ball-milled in a Shake Master Auto (Biomedical Science Co., Ltd.), and a milled product was obtained. The particle size of the milled product was from 20 to 30 μm. For the particle size measurement, a micrometer (trade name "Digimatic Standard Outer Micrometer MDC-25PJ" available from Mitutoyo Corporation) was used.

The remaining oil and/or fat was added, lecithin was added and mixed, and the mixture was liquefied.

The liquefied mixture was poured into a mold and solidified at 5° C.

Method for Evaluating Oil-Based Food Product

The flavor of the oil-based food product allowed to stand in a room at 18 to 20° C. for 1 to 3 hours is evaluated.

Evaluation of Color Tone

The color tone of the legume-derived powder material was measured using a colorimetric color difference meter ZE-6000.

○: The L value was from 40 to 60. Good x: The L value was above 60 or below 40.

Evaluation of Flavor

The oil-based food product was evaluated according to the following criteria, and an evaluation of 3 or more was regarded as acceptable.

5: Very good with reduced legume smell

4: Good

3: Slightly good

2: Slightly poor

1: Poor with strong legume smell

Overall Evaluation

The oil-based food product which was evaluated as "○" in the evaluation of color tone and evaluated as 3 in the evaluation of flavor was evaluated overall as "○".

The oil-based food product which was evaluated as "o" in the evaluation of color tone and evaluated as 4 or more in the evaluation of flavor was evaluated overall as "◎".

TABLE 1

| (Unit: parts by weight) | | Without saccharide | With saccharide |
|---|---|---|---|
| Roasted | Legume | 31.0 | 31.0 |
| | Saccharide | — | 3.0 |
| | Lecithin | 0.3 | 0.3 |
| Mixed | Sugar | 34.0 | 31.0 |
| | Oil and/or fat | 35.0 | 35.0 |
| | Lecithin | 0.2 | 0.2 |

Murasaki-hanamame was used as the legume. For the saccharide and lecithin in the column "Roasted", a mixture prepared by adding lecithin to a 33% aqueous solution of the saccharide was mixed with the legume, and the mixture was roasted. For comparative examples, the saccharide was replaced with water and mixed with the legume, and the mixture was roasted.

Study-1: Study of Effect of Fructose

Examples 1 to 3 were prepared using fructose as the saccharide according to "with saccharide" in Table 1. In Comparative Examples 1 to 5, oil-based food products were prepared according to "without saccharide" in Table 1.

Oil-based food products were prepared according to "Method for Preparing Oil-based Food Product" described above and evaluated according to "Method for Evaluating Oil-based Food Product". In the comparative examples, the mixture was roasted at a temperature similar to that in examples and for a period of time (90 minutes) three times as long as in Example 1, but this failed to reduce the L value in the color space.

TABLE 2

| | Roasted | Color tone | | | Color tone | Flavor | Overall |
|---|---|---|---|---|---|---|---|
| | saccharide | L value | a | b | evaluation | evaluation | evaluation |
| Comparative Example 1 | — | 72.2 | 3.3 | 14.2 | X | 1 | X |
| Comparative Example 2 | — | 65.8 | 3.8 | 15.8 | X | 1 | X |
| Comparative Example 3 | — | 65.9 | 3.9 | 16.2 | X | 1 | X |
| Comparative Example 4 | — | 68.5 | 3.7 | 17.2 | X | 1 | X |
| Comparative Example 5 | — | 68.7 | 3.7 | 18.1 | X | 1 | X |
| Example 1 | Fructose | 58.7 | 9.4 | 26.9 | ○ | 5 | ◎ |

TABLE 2-continued

| | Roasted | Color tone | | | Color tone | Flavor | Overall |
|---|---|---|---|---|---|---|---|
| | saccharide | L value | a | b | evaluation | evaluation | evaluation |
| Example 2 | Fructose | 51.5 | 10.1 | 26.2 | ○ | 3 | ○ |
| Example 3 | Fructose | 45.8 | 10.5 | 25.0 | ○ | 4 | ◎ |

Discussion

For the oil-based food products of examples, a color tone suitable for the oil-based food product and a good flavor were obtained.

Comparative examples, in which the roasted saccharide was not used, resulted in too strong legume smell.

In Example 1, an excellent oil-based food product with a light brown color and a strong sense of roasting was obtained.

Study-2: Study of Effects of Various Saccharides and Study of Roasting Conditions Examples 4 to 6 were prepared using honey or brown sugar as the saccharide according to "with saccharide" in Table 1.

Oil-based food products were prepared according to "Method for Preparing Oil-based Food Product" described above and evaluated according to "Method for Evaluating Oil-based Food Product".

TABLE 3

| | Roasted | Color tone | | | Color tone | Flavor | Overall |
|---|---|---|---|---|---|---|---|
| | saccharide | L value | a | b | evaluation | evaluation | evaluation |
| Example 4 | Honey | 55.9 | 9.7 | 25.5 | ○ | 5 | ◎ |
| Example 5 | Honey | 48.0 | 9.7 | 24.5 | ○ | 4 | ◎ |
| Example 6 | Brown sugar | 54.2 | 9.5 | 25.4 | ○ | 5 | ◎ |

Discussion

Similar effects were also obtained when various saccharides other than fructose were used.

INDUSTRIAL APPLICABILITY

According to the present invention, the novel oil-based food product can be provided.

The invention claimed is:

1. A chocolate product comprising a mixture of a legume-derived roasted powder material, a roasted saccharide, a roasted phospholipid, an unroasted saccharide, and at least one component selected from the group consisting of an oil and a fat, wherein the legume in the legume-derived roasted powder material is at least one selected from the group consisting of mung bean, green bean, pea, and murasaki-hanamame, wherein a weight ratio of the roasted saccharide to the legume-derived roasted powder material is from 0.01 to 0.5, and wherein a total amount of cocoa mass and cocoa solids in the chocolate product is less than 5 wt. %.

2. The chocolate product according to claim 1, wherein a mixture of the legume-derived roasted powder material and the roasted saccharide has an L value in the color space of 40 to 60.

3. The chocolate product according to claim 1, wherein the roasted saccharide is an aqueous saccharide solution.

4. The chocolate product according to claim 2, wherein the roasted saccharide is an aqueous saccharide solution.

5. The chocolate product according to claim 3, wherein the aqueous saccharide solution is an aqueous monosaccharide solution.

6. A method for producing a chocolate product, the method comprising:

roasting a mixture of a legume-derived powder material, a saccharide, and a phospholipid to obtain a roasted mixture, and combining the roasted mixture with an unroasted saccharide and at least one component selected from the group consisting of an oil and a fat to obtain the food product, wherein the legume in the legume-derived roasted powder material is at least one selected from the group consisting of mung bean, green bean, pea, and murasaki-hanamame, wherein a weight ratio of the roasted saccharide to the legume-derived roasted powder material is from 0.01 to 0.5, and wherein a total amount of cocoa mass and cocoa solids in the chocolate product is less than 5 wt. %.

7. The chocolate product according to claim 4, wherein the aqueous saccharide solution is an aqueous monosaccharide solution.

* * * * *